United States Patent
Lohr et al.

[15] 3,695,696
[45] Oct. 3, 1972

[54] VEHICLE SEAT WITH INTEGRAL SEAT AND BACK PORTIONS

[72] Inventors: Thomas E. Lohr, Warren; Robert L. Stephenson, Sterling Heights, both of Mich.

[73] Assignee: Allied Chemical Corporation, New York, N.Y.

[22] Filed: Jan. 19, 1970

[21] Appl. No.: 3,816

[52] U.S. Cl.................297/388, 24/230 A, 297/452
[51] Int. Cl................................A62b 35/02
[58] Field of Search..............297/388, 389, 385, 452; 244/122 B; 280/150 B; 24/230 A, 230 AT, 230 AV

[56] References Cited

UNITED STATES PATENTS

| | | | |
|---|---|---|---|
| 2,864,437 | 12/1958 | Spring | 297/386 |
| 3,321,244 | 5/1967 | Davies | 297/388 |
| 3,367,715 | 2/1968 | Curran | 297/389 X |
| 3,378,301 | 4/1968 | Romanzi | 297/389 |
| 3,456,981 | 7/1969 | Radke | 24/230 A |
| 3,494,664 | 2/1970 | States | 297/389 |
| 3,514,821 | 6/1970 | Saxmark | 24/230 AV |
| 2,468,560 | 4/1949 | Kirkpatrick | 297/388 |
| 3,248,148 | 4/1966 | Board et al. | 297/388 |
| 3,583,764 | 6/1971 | Lohr et al. | 297/389 |

FOREIGN PATENTS OR APPLICATIONS 638,355   2/1928   France ................24/230 AT

*Primary Examiner*—Francis K. Zugel
*Attorney*—Marvin Bressler and Jonathan Plaut

[57] ABSTRACT

A self-contained seat and restraint system including a semirigid seat shell having a channel about the rear and sides thereof, a fixed, beltless buckle in one side of the channel, and a retractable lap belt guided through and by the other side of the channel. A shoulder belt and a particular buckle design is also disclosed.

7 Claims, 4 Drawing Figures

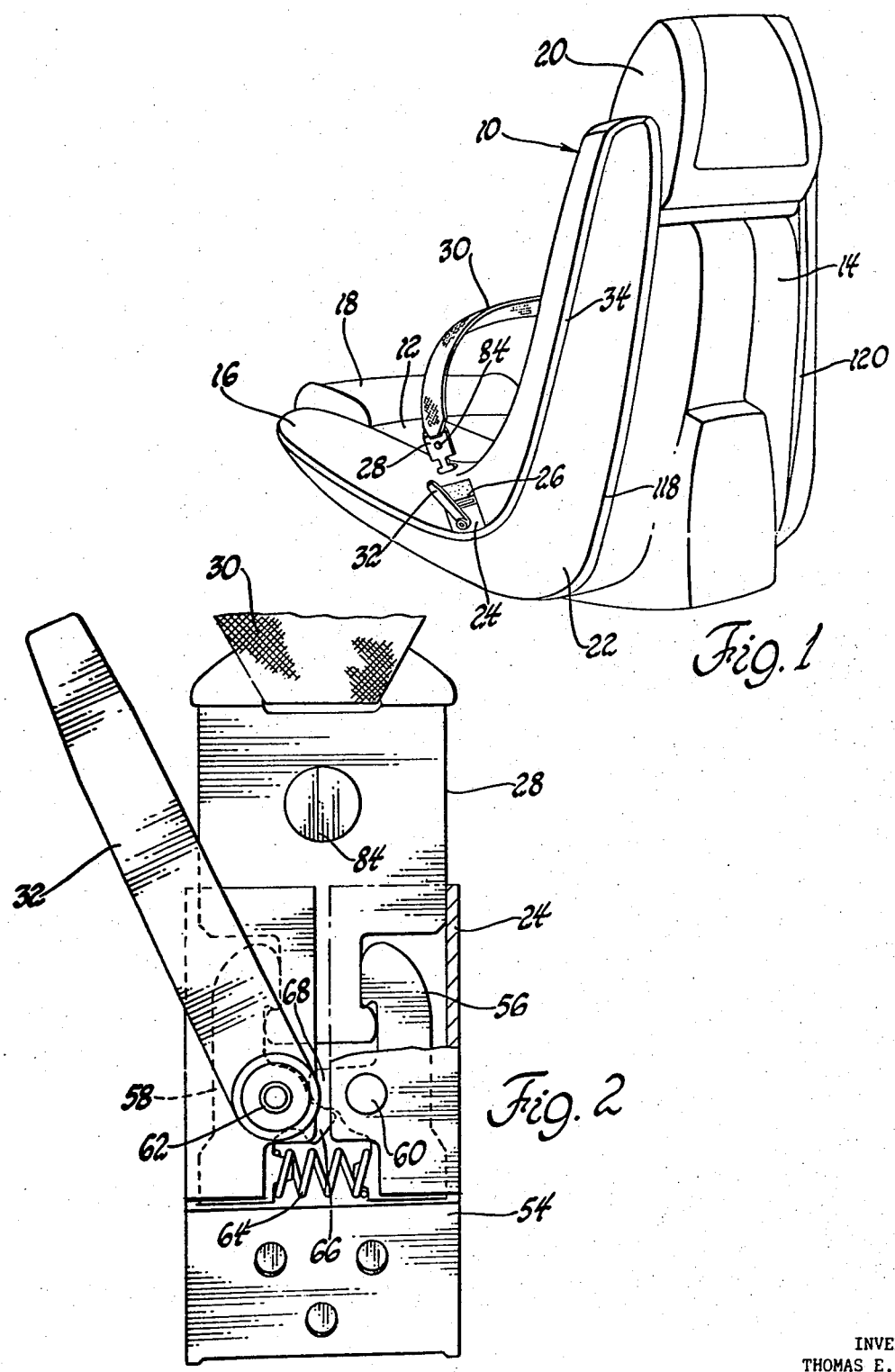

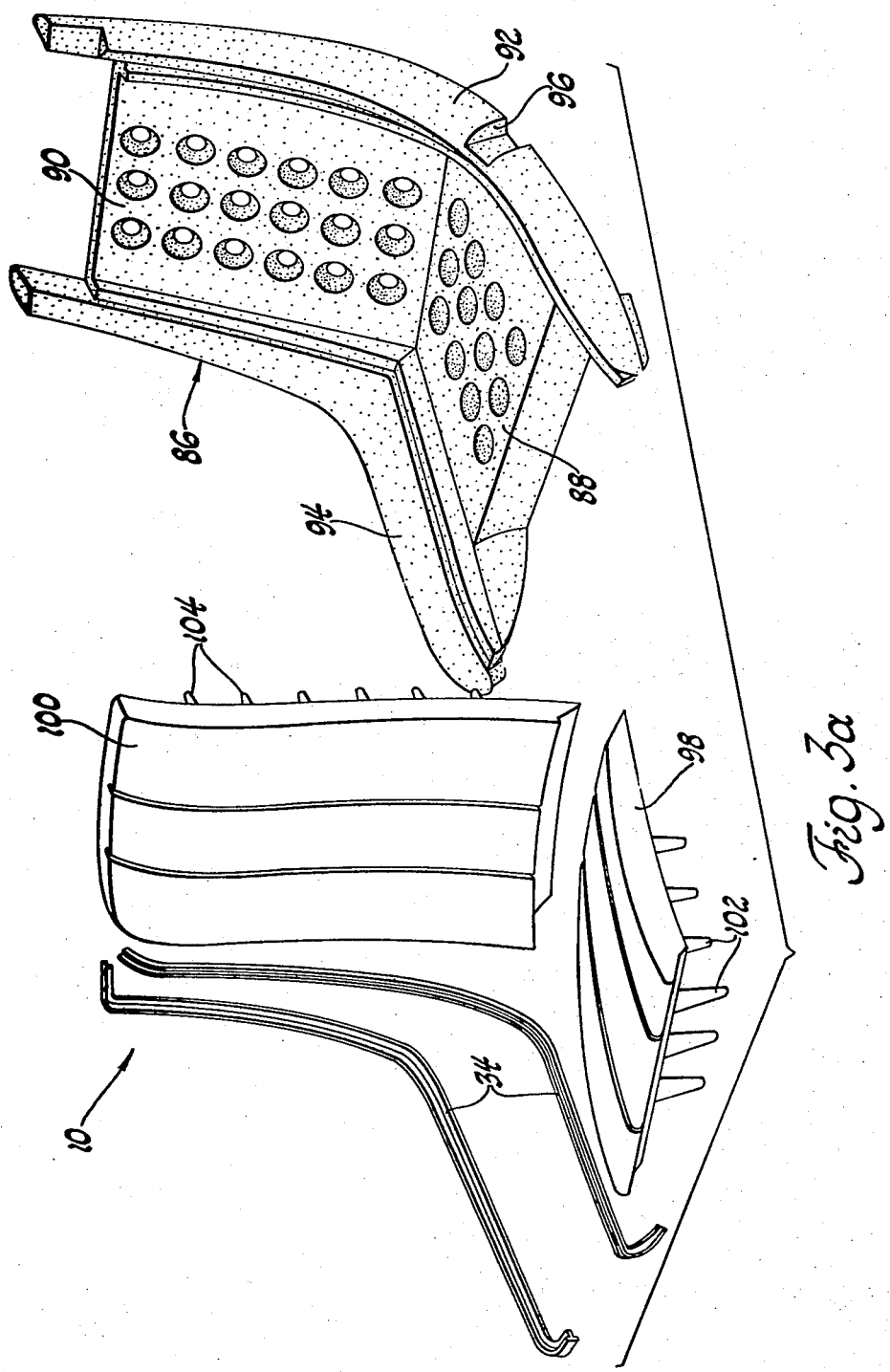

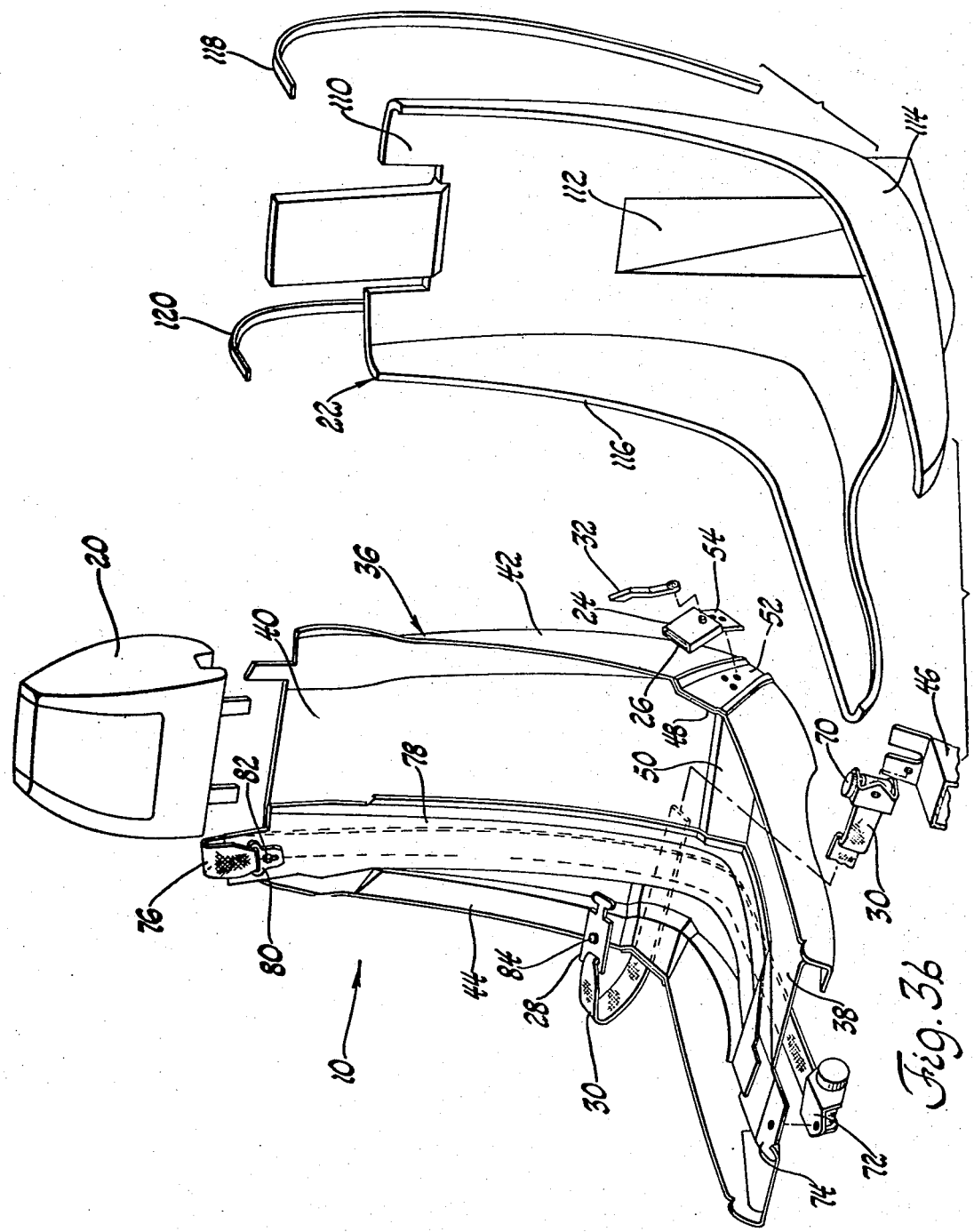

VEHICLE SEAT WITH INTEGRAL SEAT AND BACK PORTIONS

This invention relates to vehicle seats and particularly to a combination seat and restraint assembly having lap and shoulder belts cooperating with a fixed buckle.

Seat belt type restraint systems for vehicle passengers are well known and in popular use. The most common system employs belts which are anchored to the vehicle body at various places and are essentially independent of the seat. Such systems generally result in a number of loose belt ends with buckles and tongues laying about the interior of the vehicle in an unsightly and untidy manner. This condition can normally be partially alleviated by the use of retractor devices disposed at the sides of the seats and in some cases on the belt portions which lie directly on the seats. However, such retractor devices usually leave the belt portion which carries the buckle lying on the seat either loosely or in a partially retracted fashion.

In accordance with the present invention, the problem of loose belt portions in a seat belt type restraint system is substantially eliminated while, at the same time, a complete lap and shoulder belt arrangement may be provided. In general, this is accomplished by fixedly securing a buckle device directly to the seat structure rather than to the floor and by eliminating the use of webbing or other belt material in connection with the buckle device. In such a system webbing or other belt material is associated only with the tongue and may be wound about a reel also carried by the seat such that the tongue carrying belt portion may be extended to the desired length thereby to permit the tongue to be placed in locking engagement with the buckle device.

In accordance with a specific embodiment of the invention, the lap belt reel and buckle device are mounted on a semirigid seat shell of contoured single-occupant design such that the entire restraint system is carried by the shell and the structural members associated directly therewith. The shell is provided with an inwardly depressed channel about the side and back to receive on one side the buckle device and to guide on the other side the extensible belt.

In the preferred form, the invention employs a contoured, cushioned, single-occupant seat comprising a semirigid shell which is fully covered and upholstered and which provides both lap and shoulder belt restraint functions in cooperation with a fixed buckle device. The lap belt tongue is carried by an extensible belt having a retractor reel disposed rearwardly beneath the seat. The shoulder belt tongue is affixed to an extensible belt having a retractor reel mounted forwardly beneath the seat such that the shoulder belt extends upwardly along the rear surface of the shell or a panel portion affixed to the shell. Accordingly, a self-contained safety seat is provided which may be conveniently, simply, and attractively mounted within a vehicle body structure.

Various additional features and advantages of the subject invention will become apparent upon reading the following specification which describes an illustrative embodiment thereof. This specification is to be taken with the accompanying FIGURES of which:

FIG. 1 is a rear perspective view of a single-occupant seat embodying the invention;

FIG. 2 is a plan view of a buckle device used in the embodiment of FIG. 1 and shown with the tongue engaged therewith; and, FIG. 3 is an exploded view of the seat assembly of FIG. 1 illustrating the various components thereof in perspective.

Referring now to FIG. 1 there is shown a single-occupant, self-contained safety seat assembly 10 having a seat portion 12 and a back portion 14. The seat and back portion 12 and 14 are integrated and laterally bounded by contoured bolster portions 16 to provide a smooth, bucket-type contour appearance. The front edge of the seat portion 12 may be provided with an adjustable or fixed leg rest portion 18. The upper end of the back portion 14 may also be provided with a headrest 20 which is disposed between the upper ends of the contoured bolster portions 16 as shown. The rear surfaces of the bolsters 16 and the seat back 14 may be covered with a unitary molded trim shell 22 which abuts the bolster portion 16 along a curving line where a flexible trim piece 34 is to be disposed to trim the seam or intersection between the back portion 22 and the bolsters 16.

A fixed buckle 24 is disposed on the side of the seat assembly 10 within a shallow recess in the bolster portion 16 such that a rectangular mouth portion 26 opens upwardly and forwardly to receive the steel tongue 28 of a lap belt 30 into locking engagement therewith. A release handle 32 is pivotally mounted on the fixed buckle 24 to permit the tongue 28 to be released and withdrawn at the election of the occupant. The lap belt 30 is preferably mounted on a locking-type retractor reel so that it may be extended from the opposite sides of the seat as shown in FIG. 1 across the occupant and locked within the buckle 24 by suitable engagement of the tongue 28 therewith in a manner to be further described in the following portions of the specification. Other types of reels may be used such as inertia types.

Referring now to FIG. 3 and particularly to the portions thereof identified as FIGS. 3b, the seat assembly 10 is shown to comprise as a basic structural element a semirigid steel shell 36. The shell 36 is generally contoured in accordance with the overall geometry illustrated in FIG. 1 to include a seat portion 38 and a back portion 40 bounded by laterally spaced side flanges 42 and 44. The seat shell 36 is adapted to be bolted onto a mounting bracket 46 which in turn may form part of or cooperate with a seat track or adjuster assembly taking any of several known forms. Between the seat and back portion 38 and 40, respectively, of the shell 36, is disposed an inwardly depressed channel portion 48 which is contiguous with a rearwardly disposed and inwardly depressed box portion 50 so as to define a three-sided, continuous channel which extends about the shell 36 and includes not only the seat and back portions of the shell, but the side portions 42 and 44 as well. A reinforcing channel member 52 which may be fabricated of steel is disposed in the channel defined by the depressions 48 and 50 and is preferably welded to the shell 36 to form a strong, permanent bond. The channel 52 has a flat, central portion bounded by turned-up flanges which give strength and rigidity to the entire assembly and which form a guide channel for the lap belt 30 as will be made more clear in the following portion of the specification. The buckle 24 is disposed in the channel member 52 on the side portion 42 of the shell 36 such that the mouth 26 is oriented upwardly and forwardly relative to the normal position of the seat assembly 10 to receive the tongue 28 of the lap belt 30. The buckle 24 is provided with a mounting plate 54 which may be bent slightly out of the plane of the main buckle portion and is formed with a plurality of holes to permit the buckle 24 to be fixedly secured to the shell 36.

Looking to FIG. 2 the specific structural arrangement of the buckle 24 is shown in greater detail. In FIG. 2, the buckle 24 is shown to comprise a hollow, rectangular housing which is preferably made of plated steel terminating on the bottom end thereof with the mounting panel or plate 54. Carried within the housing of the buckle 24 is a pair of caliper type latch dogs 56 and 58 which are mounted for pivotal displacement about pivot point 60 and 62 respectively. Latch dog 58 is directly connected to the release handle 32 of the buckle 24 such that the counterclockwise rotation of the handle 32 is operative to spread the tongue engaging ends of the latch dogs 56 and 58 apart. The lower ends of the latch dogs 56 and 58 as seen in FIG. 2 are biased apart by means of a coil spring 64 such that the tongue engaging ends of latch dogs 56 and 58 tend to rotate toward one another.

In FIG. 2 the tongue 28 of the lap belt 30 is shown disposed in locking engagement with and between the latch dogs 56 and 58. A T-shaped tongue is illustrated, however, various other configurations may also be used. To release the tongue 28 from the latch dogs 56 and 58, the handle 32 is rotated in the counterclockwise direction as shown in FIG. 2 to engage a cam 66 carried by the latch dog 58 with a complementary cam 68 carried by the latch dog 56. This causes the latch dogs 56 and 58 to spread apart from one another thereby to permit the T-shaped tongue 28 to be readily withdrawn therefrom. It is to be understood that various fixed buckle devices may be used although the assembly of FIG. 2 may be preferred.

Returning again to FIG. 3 and particularly to FIG. 3b, the seat assembly 10 is shown to comprise a restraint system which includes the lap belt 30 carrying the plated steel tongue 28 on the end thereof. Lap belt 30 is disposed on a locking type retractor reel 70 which in turn is mounted on a rear plate carried by the mounting bracket 46. So mounted the retractor reel 70 is, in effect, mounted on the shell 36 since the shell and the mounting bracket 46 are essentially integrated during installation. The lap belt 30, thus, extends laterally through the box-type portion 50 and the depressed channel 52 in the side portion 44 of the shell 36 where it may be brought around the occupant and the shell for locking engagement with the buckle 24. The depressed portion 50 and the channel member 52 serve as guides to maintain the lap belt 30 in the proper orientation and position relative to the occupant and the shell 36.

The restraint system further comprises a locking-type shoulder belt retractor reel 72 which is mounted on a plate section 74 beneath the front portion of the seat 38 of the shell 36. With the retractor reel 72 mounted in this position the shoulder belt 76 extends rearwardly and upwardly along the rear surface of a panel 78 which is welded to the shell 36. The shoulder belt 76 extends over the top of the shell 36 as shown in FIG. 3b and terminates at a plated steel tongue 80 having a keyhole aperture 82 which cooperates with a pin 84 carried on the lap belt tongue 28. Accordingly, the normal operation of the restraint system involves an interconnection between the shoulder belt tongue 80 and the pin 84 of the seat belt tongue 28. This is followed by locking engagement of the seat belt tongue 28 with the fixed buckle 24.

Looking now to FIG. 3a the seat assembly 10 further comprises a contoured foam cushion 86 which is adapted to be disposed in the contoured shell 36 and secured thereto by means of border wires and flanges not shown. Cushion 86 comprises a deep seat portion 88, a back portion 90, and laterally spaced bolster portions 92 and 94 which are contoured to conform to and generally overlap the side portions 42 and 44 of the seat shell 36. Bolster portion 92 is notched out at 96 to provide clearance for the buckle 24 and a release handle 32. The material used for the cushion 86 is preferably self-skining polyurethane foam. However, other materials including fabric trimmed foam rubber may also be used.

The seat assembly 10 further includes trim pieces including a seat trim section 98 and a back trim section 100 having protruding prongs 102 and 104, respectively, which extend into openings in the cushion 86. The seat and back sections 98 and 100, respectively, are disposed between the bolster portions 92 and 94 of the cushion 86. Side trim pieces 34 are adapted to cooperate with the overall assembly to conseal joints and junctions and seams between adjacent parts.

Referring again to FIG. 3b the seat assembly 10 is completed by means of the molded rear trim shell 22 which may be constructed by high-impact plastic or other suitable material. The rear trim shell 22 includes a contoured back section 110 having a boxed central portion 112 to enclosed the lap belt reel 70 and the seat assembly mounting bracket 46. Back portion 110 is laterally bounded by upwardly and forwardly extending side portions 114 and 116 which as shown in FIG. 1 are contoured to mate with the lower and rearward surface of the bolsters 92 and 94 of the cushion 86. Finally, rear trim sections 118 and 120 complete the appearance of the seat as shown in FIGS. 1 and 3b.

It is to be understood that the embodiment illustrated in the drawings and described above is illustrative and is not to be construed in a limiting sense.

The embodiments of the invention in which an exclusive property or privilege is claimed are defined as follows:

1. A seat assembly comprising:
   a seat support member having seat, back and side portions, said member provided with means defining a channel extending around the member mediate the seat and back portions;
   a lap belt means including a belt portion and a tongue on the belt, said belt portion connected to one side of said channel; and
   a buckle means beltlessly and rigidly secured to said channel member on the side opposite the disposition of said lap belt means, said buckle means including a housing having a mouth portion opening forwardly and upwardly for receiving said lap belt tongue, a pair of caliper latch dogs within said buckle housing, bias means urging the dogs toward a tongue-engaging position, and a pivotal handle operatively connected to spread the dogs upon pivotal displacement thereof, said member is a contoured seat shell and the means defining the channel includes a depression in the shell extending from one side portion to the other, and a rigid channel member disposed in the depression and secured to the shell.

2. A seat assembly as defined in claim 1 wherein the lap belt means comprises a reel mounted rearwardly beneath the member.

3. A seat assembly as defined in claim 1 including a shoulder belt assembly carried wholly by the member.

4. A seat assembly as defined in claim 3 wherein the shoulder belt assembly includes a reel mounted on and beneath the seat portion of the member and a belt portion extending rearwardly and upwardly along the back portion of the member.

5. A seat assembly as defined in claim 4 including a tongue carried by the shoulder belt portion and connectible to the lap belt tongue.

6. A seat assembly as defined in claim 1, the combination further including cushion means disposed in the shell.

7. A seat assembly as defined in claim 6 wherein the shell is formed of substantially unified sheet material.

* * * * *